United States Patent [19]

Peters

[11] Patent Number: 4,863,204

[45] Date of Patent: Sep. 5, 1989

[54] ARTICLE HANDLING TOOL

[76] Inventor: Gerald L. Peters, 1201 Sand Bar Ferry Rd., Beech Island, S.C. 29841

[21] Appl. No.: 178,381

[22] Filed: Apr. 6, 1988

[51] Int. Cl.$^4$ ................................................ B25J 1/00
[52] U.S. Cl. .................................. 294/19.1; 294/115; 294/906
[58] Field of Search ...................... 294/19.1, 22, 50.8, 294/104, 106, 110.1, 115, 116, 119.1, 906; 901/31, 32, 36-39

[56] References Cited

U.S. PATENT DOCUMENTS

| | | | |
|---|---|---|---|
| 582,293 | 5/1897 | Koester | 294/19.1 X |
| 872,748 | 12/1907 | Putney | 294/19.1 |
| 2,493,108 | 1/1950 | Casey | 294/19.1 |
| 2,916,323 | 12/1959 | Van Berkum | 294/115 |
| 3,219,376 | 11/1965 | Peters | 294/115 X |
| 3,312,496 | 4/1967 | Boutelle et al. | 294/115 X |
| 3,465,986 | 9/1969 | Milly | 294/19.1 X |
| 4,368,913 | 1/1983 | Brockmann et al. | 294/106 |
| 4,456,293 | 6/1984 | Panissidi | 294/106 |
| 4,669,769 | 6/1987 | Polder | 294/19.1 |

FOREIGN PATENT DOCUMENTS

| | | | |
|---|---|---|---|
| 1531133 | 7/1969 | Fed. Rep. of Germany | 294/106 |
| 3335728 | 4/1985 | Fed. Rep. of Germany | 294/19.1 |
| 1024272 | 6/1983 | U.S.S.R. | 294/106 |
| 1279937 | 12/1986 | U.S.S.R. | 294/115 |
| 2105676 | 3/1983 | United Kingdom | 294/106 |

Primary Examiner—Johnny D. Cherry
Attorney, Agent, or Firm—Wigman & Cohen

[57] ABSTRACT

A tool for gripping a remotely located article includes an elongated tubular housing, a tool actuating assembly connected to one end of the housing, and a jaw support member connected to the other end of the housing. A first jaw member having a gripping surface is supported on the jaw support member by a first pair of arms, and a second jaw member having a gripping surface is supported on the jaw support member by a second pair of arms so that the gripping surfaces of the jaw members are disposed in parallel, confronting relation. The two pairs of arms are slidingly and pivotably connected to the jaw support member so that the gripping surfaces of the jaw members may be moved between a first, open position and a second, closed position for gripping an article. When moving between the first and second positions the gripping surfaces move in parallel relation to one another. The tool actuating assembly includes an over-center toggle mechanism so that the jaws are held locked when in the gripping position. An adjustment mechanism for adjusting the distance between the gripping surfaces of the jaw members is provided for accommodating articles of varying size and shape. In an additional embodiment, a plurality of tubular housing sections are provided. A lever arm for operating the tool actuating assembly is formed so that it lies against the elongated tubular housing when the jaw members are moved into the gripping position.

22 Claims, 3 Drawing Sheets

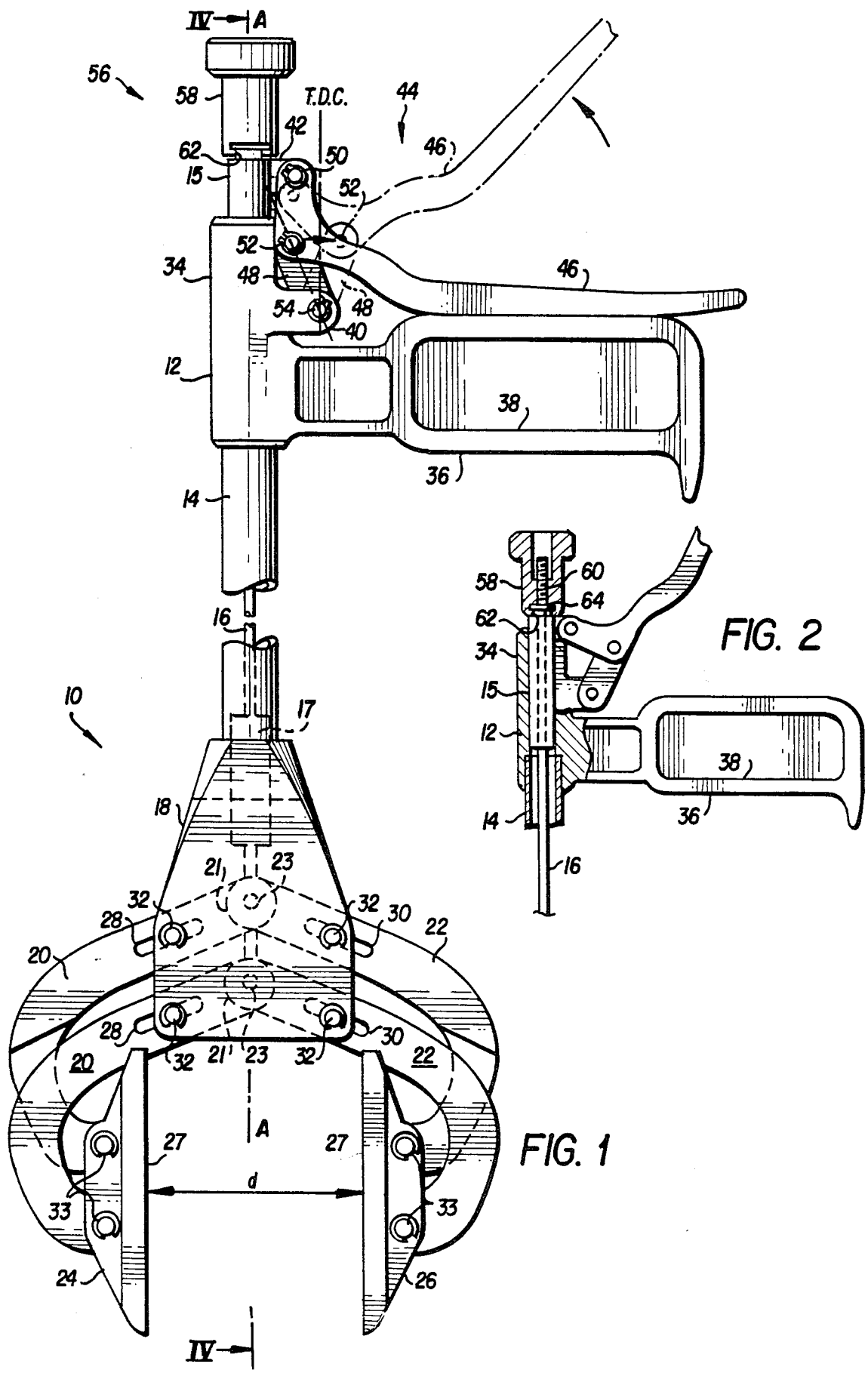

ARTICLE HANDLING TOOL

BACKGROUND OF THE INVENTION

The present invention relates to a tool for gripping remotely located articles and more particularly to a gripping tool having spaced parallel jaw members which are manually actuated.

A search of the prior art failed to uncover any prior art references which disclose the gripping tool of the present invention. A number of patents were uncovered which disclose various article gripping tools. The following is a listing of the patents uncovered during the aforementioned search:

| U.S. Pat. No. | Patentee | Issue Year |
| --- | --- | --- |
| 1,455,613 | Heppenstall | 1923 |
| 2,493,108 | Casey | 1950 |
| 2,916,323 | Van Berkum | 1959 |
| 3,312,496 | Boutelle et al | 1967 |
| 3,937,512 | Baughman | 1976 |
| 4,005,897 | Smith | 1977 |
| 4,039,216 | Soos | 1977 |
| 4,669,769 | Polder | 1987 |

Gripping tools such as those in accordance with the present invention find their primary use in the nuclear reactor industry. These tools as designed are intended, among other things, for handling radioactive materials under water. High level radioactive materials are stored and handled in clear water fuel pools in the nuclear industry. Such pools are very deep, some, for example, being as deep as 120 feet. The water provides shielding for the environment and the personnel handling the nuclear material. At the same time, the nuclear materials are cooled and stabilized.

At times it is necessary to be able to reach into the nuclear reactor, using a gripping tool, to retrieve unwanted or dropped items from the reactors. Some reactor vessels are 120 feet deep from the work platforms. Items to be handled vary in size from small flakes to very heavy objects such as nuts and wrenches. In one incident which resulted in a three day delay of a reactor start-up, a cold chisel which was being used some distance from an open fuel position in a reactor vessel, inadvertently dropped into the reactor opening. The cost of retrieving the chisel was estimated at over $400,000.00.

Prior art gripping tools are known in which the jaw faces do not maintain a parallel relationship during the gripping operation, such as U.S. Pat. No. 3,219,376 of the present inventor and U.S. Pat. No. 1,455,613 to Heppenstall. For example, in the tool of Heppenstall, the jaws are spring-loaded and any parallelism of the jaws is the result of the shape of the object being grasped when the jaws are closed. A further prior art device is disclosed in U.S. Pat. No. 3,312,496 to Boutelle et al, which attempts to maintain the parallelism between the two jaw faces as the jaw members are moved between the open and closed positions. However, the device of Boutelle et al employs a complicated mechanism, which is not suitable for use in the nuclear industry. In the nuclear industry simplicity of design is an important factor, since in the handling of nuclear or hazardous products all potential aspects of safe operations must be considered and the tools must be designed to contain the least possible points of failure with a bare minimum of parts which, in use, could possibly fall off or otherwise be dislodged. Furthermore, in these devices the closure method should offer a feature of instant opening of the jaws should a member fail due to breakage or failure. Thus, the gripping tools for the aforedescribed application in the nuclear industry should be as fail-safe as possible.

While the current use contemplated for the gripping tool of the invention is primarily in the nuclear field, a much broader application of the tool is, of course, possible. For example, the gripper in accordance with the present invention could be used on robotic equipment. Forest products could be handled by the gripping tool of the invention, if the tool were made on a much larger scale. Hydraulic and air closing operation of the tool is also possible. Grippers for unmanned submarines and outer space uses are also possible. The device could also be useful for handling high temperature objects, such as in the blacksmithing art or for laboratory use.

SUMMARY AND OBJECTS OF THE INVENTION

In view of the foregoing limitations and shortcomings of the prior art devices, as well as other disadvantages not specifically mentioned above, it should be apparent that there still exists a need in the art for a gripping tool which maintains parallelism between the jaws in a fail-safe manner. It is therefore a primary objective of this invention to fulfill that need by providing a tool for gripping a remotely located article which maintains the parallelism between the two jaw faces of the tool as the jaw faces are moved from an open to a closed position.

It is another object of this invention to provide such a tool for gripping a remotely located article which is readily adjusted.

It is another object of this invention to provide a tool for gripping a remotely located article wherein the tool actuating assembly has an over-center toggle mechanism.

Yet another object of this invention is to provide such a tool which is relatively fail-safe in operation.

Still another object of this invention is to provide a tool which has a simplicity of movement, thereby reducing the number of parts of the mechanism for safe use in operation of the tool.

Briefly described, the aforementioned objects are accomplished according to the invention by providing an elongated tubular housing defining a longitudinal axis of the tool, with a tool actuating assembly connected to one end of the housing. Jaw support means are connected to the other end of the housing. A first jaw member and a second jaw member are supported on the jaw support means and are disposed so that the jaw members are in parallel, confronting relation with respect to the gripping surfaces of the two jaw members. The jaw support means includes a support member and a first and second pair of arms. At least one pair of the arms is slidingly and pivotably connected to the support member, with the jaw support means connecting the tool activating assembly to the first and second jaw members for movement of the first and second jaw members between an open and a closed position. The gripping surfaces are moved in parallel relation with one another from the open to the closed positions. Further, the tool actuating assembly is an over-center toggle mechanism. Finally, an adjustment means located proximate to the tool actuating assembly allows adjustment of the distance between the first and second jaw members in the closed or open positions.

The foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a side view of a first embodiment of the invention, with the tubular housing partly broken away for purposes of illustration.

FIG. 2 is a partial sectional view of the handle and over-center toggle mechanism of the first embodiment of the tool.

DETAILED DESCRIPTION OF THE PREFERRED EMBODIMENT

Figure 3:
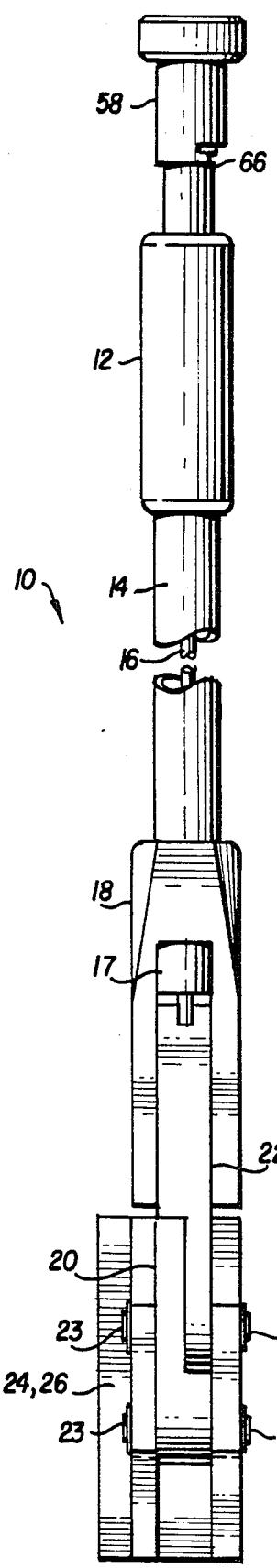
FIG. 3 is a further side view of the tool taken along a plane rotated 90° with respect to the plane illustrated in FIG. 1.

Referring now in detail to the drawings wherein like parts are designated by like reference numerals throughout, there is illustrated in FIGS. 1 through 4 a tool for gripping remotely located articles which is designated generally by reference numeral 10.

Figure 4:
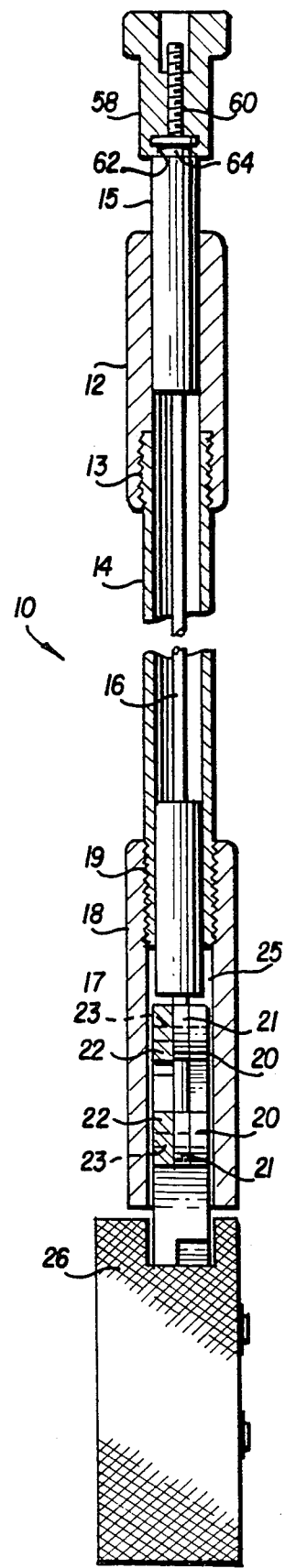
FIG. 4 is a cross sectional view of the first embodiment of the tool, taken along line IV—IV of FIG. 1.

Gripping tool 10 comprises a handle 12 which is fixed to one end of an elongated tubular housing 14 by means of a threaded connection 13 (FIG. 4). Elongated tubular housing 14 is connected at the other end to a jaw support means or cross piece 18 by means of a threaded connection 19 (FIG. 4). A connecting shaft or push rod 16 is located within the interior of housing 14 and extends coaxially within the housing from a position beyond handle 12 to a position just short of the free extremity of jaw support means 18. Connecting shaft 16 is threaded at both ends; at one end for threaded engagement outwardly of the handle 12 with an adjustment knob 58 held captive on a rear actuating piston 15 which is slidingly received in a bore in handle 12; and at the other end in the area of jaw support means 18 with a front actuating piston 17 which is slidingly received in tubular housing 14.

Jaw support means 18 is provided with a hollow interior at its forward or outermost end. A first pair of generally C-shaped arms 20 are provided with one end of arms 20 lying within the hollow interior of jaw support means 18. A second pair of generally C-shaped arms 22 are provided with one end of each of the arms also lying within the hollow interior of jaw support means 18 and extending in a direction which is generally opposed to the direction in which the arms 20 extend. Each end of the arms 20 which lies within the hollow interior of jaw support means 18 is pivotally connected with a respective one of the ends of arms 22 and with front actuating piston 17 at one of two enlarged portions 21 of front actuating piston 17 by means of pins 23. Each of the confronting interior walls of the jaw support means 18 is provided with a longitudinally extending groove 25 (FIG. 4) to accommodate and guide the ends of pins 23 projecting from the front and rear surfaces of arms 20, 22.

One of the shanks of each of the C-shaped arms 20 is provided with a longitudinally extending cam slot 28. Similarly, one of the shanks of each of the C-shaped arms 22 is provided with a longitudinally extending cam slot 30. Each of the cam slots 28, 30 slidingly cooperates with one of two pairs of cam pins 32 which are fixed in jaw support means 18. The pins 32 extend from the front surface to the rear surface of jaw support means 18 through holes formed in jaw support means 18. Cam pins 32 are retained in jaw support means 18 by suitable retainers, such as conventional retaining rings, disposed at the front and rear surfaces of jaw support means 18.

At their other ends, arms 20 are pivotally connected to a first jaw member 24 by means of pivot pins 33. Similarly, the other ends of arms 22 are pivotally connected to a second jaw member 26 by means of pivot pins 33. Pivot pins 33 are retained on jaw support members 24, 26 in a manner similar to that in which cam pins 32 are retained on jaw support means 18. A plane intersecting the axes of the pivotal connections of arms 20, 20 with first jaw member 24 by pivot pins 33 is disposed parallel to the longitudinal axis A—A of the tool. A plane intersecting the axes of the pivotal connection of arms 22, 22 with second jaw member 26 by pivot pins 33 is also disposed parallel to the longitudinal axis A—A of the tool. Each of the jaw members 24, 26 has a gripping surface 27. Jaw members 24 and 26 are arranged on arms 20, 22, respectively, such that gripping surfaces 27 are disposed in parallel, confronting relation with one another. In the illustrated embodiment, gripping surfaces 27 are generally rectangularly-shaped flat surfaces having a knurled surface finish. It will be appreciated, however, that gripping surfaces 27 may be so configured as to accommodate a variety of articles to be gripped, such as round bars, and the so-configured gripping surfaces may be oriented either parallel with or perpendicular to the longitudinal axis A—A of the tool 10.

It will be apparent from a further consideration of FIG. 1 that a first plane intersects the axes of the pivotal connections of the ends of arms 20, 20 with enlarged portions 21, 21 of front actuating piston 17 by pivot pins 23, and a second plane intersects the axes of the pivotal connection of the ends of arms 22, 22 with enlarged portions 21, 21 of front actuating piston 17 by pivot pins 23. In the illustrated embodiment, the first and second planes coincide with each other and with the longitudinal axis A—A of the tool. As previously described, a third plane intersects the axes of the pivotal connections of the ends of arms 20, 20 with the first jaw member 24 by pivot pins 33, and a fourth plane intersects the axes of the pivotal connections of the ends of arms 22, 22 with the second jaw member 26 by pivot pins 33. A fifth plane intersects the axes of the pivotal connections of arms 20, 20 to jaw support member 18 intermediate the ends of arms 20, 20 by means of cam slots 28, 28 guided on cam pins 32, 32 and a sixth plane intersects the axes of the pivotal connections of arms 22, 22 to jaw support member 18 intermediate the ends of arms 22, 22 by means of cam slots 30, 30 guided on pins 32, 32. In accordance with the invention, all of the six planes are parallel to one another, and remain parallel to one another during movement of jaw members 24, 26 between the open and closed positions.

At the end of the elongated tubular housing 14 opposite jaw support means 18, a handle 12 for actuating and gripping the tool 10 is provided. Handle 12 is provided with a tubular section 34 which is threadedly engaged over the end of tubular housing 14 by means of a threaded connection 13 (FIG. 4) so as to rigidly fix handle 12 to housing 14. Rear actuating piston 15 is slidingly received in the end of tubular section 34 opposite to threaded connection 19. Rear actuating piston 15 is provided with a central longitudinal bore having a diameter greater than the diameter of connecting shaft 16 so that shaft 16 can freely passes through piston 15 for assembly of the tool. However, shaft 16 is connected to piston 15 through the intermediary of an adjustment knob 58 which is held captive on piston 15 in a manner to be described hereinafter. Adjustment knob 58 is connected to shaft 16 by means of an internal thread 60 which engages the threaded end of shaft 16.

Extending perpendicularly away from tubular section 34 of handle 12 is a gripping section 36, which is provided with an opening 38 to accommodate the hand of the user of tool 10. A bifurcated projection 40 projects perpendicularly away from tubular section 34, disposed to the rear or outwardly of gripping section 36. A projection 42 also projects perpendicularly away from rear actuating piston 15, toward the rear or outward end of piston 15.

Extending between the bifurcations of projection 40 of handle 12 and projection 42 of rear actuating piston 15 is an over-center toggle mechanism, generally designated by reference numeral 44. Over-center toggle mechanism 44 includes a lever arm 46 and a link 48. Lever arm 46 is pivotally connected at the end of a shank of the lever arm to projection 42 of rear actuating piston 15 by means of a pivot pin 50. The other end of this shank of lever arm 46 is pivotally connected to one end of link 48 by means of a pivot pin 52. The other end of link 48 is pivotally connected to projection 40 of handle 12 by means of another pivot pin 54.

When lever arm 46 and link 48 are placed in the solid line positions illustrated in FIG. 1, link 48 and lever arm 46 are so arranged that the spacing between pivot pins 54 and 50 is near the maximum spacing. In this position, then, piston 15 assumes substantially its maximum rearward position, in other words, to the right as illustrated in FIG. 1, with respect to handle 12 and elongated tubular housing 14. Also in this position, pivot pins 23, connecting arms 20, 20, 22, 22 with front actuating piston 17, are positioned at their extreme rearward position, in other words to the right as illustrated in FIG. 1. In this position, then, arms 20, 20 and 22, 22 are positioned on pivot pins 32 such that the distance d between first jaw member 24 and second jaw member 26 is at a minimum, so that the jaws are closed for grasping an object therebetween.

When lever arm 46 and link 48 are in the phantom line position illustrated, in FIG. 1, pivot pin 52 connecting link 48 and lever arm 46 is displaced downwardly as seen in FIG. 1 or away from the longitudinal axis A—A of the tool, and pivot pin 50 is moved to a position closer to pivot pin 54. Piston 15 is thus moved to a forward position with respect to handle 12 and housing 14, or to the left as illustrated in FIG. 1. In this position, pivot pins 23 are positioned in their forward position within jaw support member 18, in other words to the left in FIG. 1. Arms 20, 20, 22, 22 are thus positioned with respect to cam pins 32 such that the distance d between first jaw member 24 and second jaw member 26 is at a maximum. In this position, then, jaw members 24 and 26 are open and provide sufficient clearance such that an article may be positioned therebetween, in preparation for gripping the article.

One important feature of the over-center toggle mechanism 44 is that the link and lever arrangement provides a considerable mechanical advantage in closing the jaw members of the tool. Another important feature of over-center toggle mechanism 44 is due to the movement of pivot pin 52 just slightly over a center axis of the toggle mechanism drawn between pivot pins 54 and 50. Due to this arrangement, when jaw members 24, 26 are closed in other words, when lever arm 46 assumes the solid line position illustrated in FIG. 1, with lever arm 46 abutting gripping section 36 of handle 12, lever arm 46 is locked in this over-center position of toggle mechanism 44 and jaw members 24, 26 will positively and forcefully grip the remotely located article until lever arm 46 is moved from the locked position with the substantial force necessary to shift the over-center toggle mechanism to the phantom line position.

An adjustment means, generally indicated by numeral 56, is provided at the rear end of rear actuating piston 15, proximate the tool actuating assembly, for adjusting the distance d between first and second jaw members 24, 26 so that a variety of sizes of articles may be gripped therebetween. Adjustment means 56 includes an adjustment knob 58 which is provided with an internal thread 60 for receipt of the threaded end of connecting shaft 16. An inwardly projecting lip 62 is formed at the forward end of knob 58 and mates with a groove 64 formed on the rear end of rear actuating piston 15. By means of lip 62 mating with groove 64, adjustment knob 58 is held captive on rear actuating piston 15 and is rotatable on rear actuating piston 15. As adjustment knob 58 is rotated on rear actuating piston 15 threads 60 engage the threaded end of connecting shaft 16 and move the shaft 16 either forwardly or rearwardly within elongated housing 14, depending on the direction of rotation of adjustment knob 58. As connecting shaft 16 is moved forwardly or rearwardly it carries with it front actuating piston 17 and enlarged portions 21, 21 connected to the rear ends of arms 20, 20 and 22, 22 by pivot pins 23. Arms 20, 20, 22, 22 thus slide and pivot within jaw support member 18, with slots 28, 28, 30, 30 riding on cam pins 32. Jaw members 24, 26 are accordingly brought closer together or are forced further apart, adjusting distance d between the jaw members. Adjustment knob 58 is also provided with an opening 66 (see FIG. 3) in the side of the adjustment knob 58 in the area of lip 62 so that the adjustment knob may be slid over the end of rear actuating piston 15 for assembly of the adjustment knob.

In operation, the tool 10 is first readied for gripping a remotely located article by adjusting the distance d between first jaw member 24 and second jaw member 26. To adjust the distance jaw members 24, 26 are first closed by moving lever arm 46 to the full line position illustrated in FIG. 1. Since the articles to be gripped are usually of constant size and shape, an article of the same or similar size and shape as the one to be gripped is positioned between jaw members 24, 26. Adjustment knob 58 is then rotated to adjust the distance d so that the test article firmly fits between and is forcefully gripped by jaw members 24 and 26. The test article is then released from the jaw members 24, 26 by moving lever arm 46 to the phantom line position shown in FIG. 1, thereby opening jaw members 24, 26.

With the jaw members 24, 26 in the open position, that is, with lever arm 46 moved to the phantom line position in FIG. 1, the operator holds the tool 10 by handle 12 and positions the tool so that jaw members 24, 26 surround the remotely located article to be gripped. Gripping the handle 12 with the operator's fingers received in opening 38, the operator squeezes lever arm 46 so that it moves from the phantom line position to the full line position shown in FIG. 1. This movement of lever arm 46 causes pivot pin 52 to be displaced in the upward direction of FIG. 1 or toward the longitudinal axis A—A of the tool. The movement of pivot pin 52 against link 48 pushes pivot pin 50 to the rear, or to the right in FIG. 1, and carries rear actuating piston 15 in the same direction. Rear actuating piston 15 moving to the rear carries in turn adjustment knob 58, connecting shaft 16, front actuating piston 17 having enlarged portions 21, pivot pins 23 and the ends of arms 20, 20, 22, 22 to which pivot pins 23 are connected, to the rear, or to the right in FIG. 1. Arms 20, 20 and 22, 22 thus slide and pivot on jaw support member 18, with cam slots 28 of arms 20, 20 and cam slots 30 of arms 22, 22 sliding and pivoting on cam pins 32 fixed to jaw support member 18. The sliding and pivoting movement of arms 20, 20, 22, 22 brings jaw member 24, which is pivotally connected to the ends of arms 20, 20 by pivot pins 33, and jaw member 26, which is pivotally connected to the ends of arms 22, 22 by pivot pins 33, together, so that gripping surfaces 27 firmly grasp the article to be gripped. Due to the arrangement of cam slots 28, 30 riding on cam pins 32 and the alignment of pivot pins 33 on jaw members 24, 26, respectively, jaw surfaces 27 move in a parallel relation to one another between the open and closed positions of jaw members 24, 26. The entire tool 10 is then lifted and swung by the operator to a suitable location, with the article firmly gripped between jaw members 24, 26. Lever arm 46 is then moved by the operator to the phantom line position shown in FIG. 1, opening jaw members 24, 26 and releasing the article.

Figures 5, 6:
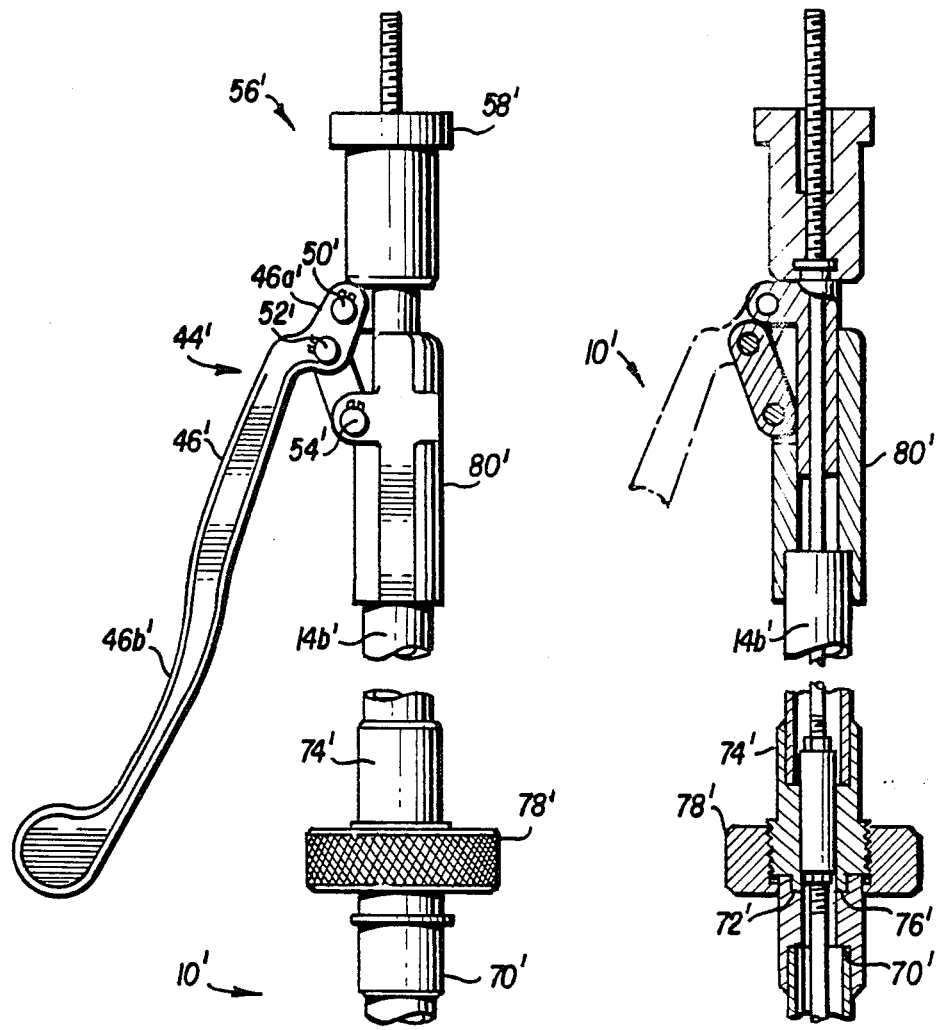
FIG. 5 is a side view of a second embodiment of the invention.
FIG. 6 is a cross-sectional view of the embodiment of FIG. 5.

Referring now to FIGS. 5 and 6, an alternate embodiment of the invention is illustrated the tool of the alternate embodiment being designated by the reference numeral 10'. In the illustrated embodiment, the elongated tubular housing is formed by a front elongated tubular housing 14a' and a rear elongated tubular housing 14b'. A female coupling sleeve 70' threadingly engages the rear end of front housing 14a', and is firmly fixed to housing 14a'. Female sleeve 70' is provided with a groove 72' at the rear end thereof. A male coupling sleeve 74' threadingly engages the front end of rear housing 14b' and is firmly fixed thereto. A tongue 76' is formed on the front of male coupling sleeve 74' and mates with groove 72 formed on the rear of female coupling sleeve 70'. The outside of the front end of male coupling sleeve 74' is threaded for engagement with a knurled coupling nut 78'. To assemble the elongated tubular housing of tool 10' of the illustrated embodiment, front housing 14a' and rear housing 14b' are brought into abutting engagement with one another, with, tongue 76' mating in groove 72'. Knurled coupling nut 78' is then threaded onto the front end of male coupling sleeve 74' and tightened so that a firm connection is achieved between front housing 14a' and rear housing 14b'. According to this embodiment, the elongated tubular housing may be made from a plurality of tubular housing segments, thereby facilitating the manufacture of the tool 10' and assembly of the tool into any desired length.

An additional difference between the embodiment of FIGS. 5 and 6 and that of FIGS. 1 through 4, lies in the use of a tool actuating sleeve 80' which is not provided with an extending gripping section 36, as is the embodiment of FIGS. 1 through 4. Further, lever arm 46' is formed so that an axis drawn through pivot pins 52', 50' passing through shank 46a' is substantially parallel with the longitudinal axis of the arm portion 46b' of lever arm 46'. According to this arrangement, when lever arm 46' is moved into the position to close jaws 24', 26', arm portion 46b' of lever arm 46' lies against the outside surface of rear housing 14b'. When the operator manipulates the tool 10' with an article gripped between jaws 24', 26', arm section 46b' of lever arm 46' together with rear housing 14b' is gripped by one hand of the operator.

In the embodiment of FIGS. 5 and 6, the operation and structure of the jaws, including jaw members 24', 26, arms 20', 20', 22', 22', jaw support member 18, as well as over-center toggle mechanism 44' and adjustment means 56' including adjustment knob 58' are all the same as that of the embodiment illustrated at FIGS. 1 through 4. Accordingly, further description of those features of the embodiment of FIGS. 5 and 6 is unnecessary.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A tool for gripping a remotely located article comprising:
   an elongated tubular housing defining a longitudinal axis of said tool;
   a tool actuating assembly connected to one end of the housing;
   jaw support means connected to the other end of said housing;
   a first jaw member supported on said jaw support means and having a gripping surface;
   a second jaw member supported on said jaw support means and having a gripping surface, said gripping surface of said second jaw member being disposed in parallel, confronting relation with said gripping surface of said first jaw member;
   said jaw support means including a support member and first and second pairs of arms, at least one pair of which is slidingly and pivotably connected to said support member, said jaw support means connecting said tool actuating assembly to said first and second jaw members for movement of said first and second jaw members between a first position in which the gripping surfaces of said jaw members are disposed in spaced, parallel relation to one another and a second position in which the gripping surfaces of said jaw members are disposed in a closer, parallel relation to one another than the first position for gripping an article therebetween, said gripping surfaces moving in parallel relation to one another from said first position to said second position;
   wherein each of said arms has first and second ends, the first end of at least one of said arms being pivotally connected to said tool actuating assembly, the second end of said one arm being pivotally connected to one of said jaw members and said one arm being slidingly and pivotally connected to said support member intermediate the first and second ends of said one arm.

2. A tool according to claim 1 comprising:
adjustment means located proximate the tool actuating assembly for adjusting the distance between said first and second jaw members in said second position.

3. The tool according to claim 1 wherein said elongated tubular housing comprises a plurality of tubular housing sections.

4. The tool according to claim 3 further comprising means for coupling said plurality of tubular housing sections to form said elongated tubular housing.

5. The tool according to claim 4 wherein said means for coupling said plurality of tubular housing sections comprises a male coupling sleeve fixed to one end of one of said tubular housing sections and a female coupling sleeve fixed to a corresponding end of another of said tubular housing sections, said male coupling sleeve having a tongue mating with a groove formed in said female coupling sleeve.

6. The tool according to claim 5 further comprising a coupling nut having an internal thread for threaded engagement with a thread provided on the outside of said male coupling member for coupling said plurality of tubular housing sections.

7. A tool for gripping a remotely located article comprising:
an elongated tubular housing defining a longitudinal axis of said tool;
a tool actuating assembly connected to one end of the housing;
jaw support means connected to the other end of said housing;
a first jaw member supported on said jaw support means and having a gripping surface;
a second jaw member supported on said jaw support means and having a gripping surface, said gripping surface of said second jaw members being disposed in parallel, confronting relation with said gripping surface of said first jaw member;
said jaw support means including a support member and first and second pairs of arms, at least one pair of which is slidingly and pivotably connected to said support member, said jaw support means connecting said tool actuating assembly to said first and second jaw members for movement of said first and second jaw members between a first position in which the gripping surfaces of said jaw members are disposed in spaced, parallel relation to one another and a second position in which the gripping surfaces of said jaw members are disposed in a closer, parallel relation to one another than the first position for gripping an article therebetween, said gripping surfaces moving in parallel relation to one another from said first position to said second position;
wherein each of said arms has first and second ends, the first ends of said arms being pivotally connected to said tool actuating assembly, the second ends of said first pair of arms being pivotally connected to said first jaw member, the second ends of said second pair of arms being pivotally connected to said second jaw member and said arms being slidingly and pivotally connected to said support member intermediate the first and second ends of said arms.

8. A tool according to claim 7, wherein a plane intersecting the axes of the pivotal connections of the second ends of the first pair of arms to the first jaw member and a plane intersecting the axes of the pivotal connections of the second ends of the second pair of arms to the second jaw member are disposed parallel to the longitudinal axis of the tool.

9. A tool according to claim 7, wherein a first plane intersects the axes of the pivotal connections of the first ends of the first pair of arms, a second plane intersects the axes of the pivotal connections of the first ends of the second pair of arms, a third plane intersects the axes of the pivotal connections of the second ends of the first pair of arms, a fourth plane intersects the axes of the pivotal connections of the second ends of the second pair of arms, a fifth plane intersects the axes of the pivotal connections to the support member intermediate the ends of the first pair of arms, and a sixth plane intersects the axes of the pivotal connections to the support member intermediate the ends of the second pair of arms.

10. A tool according to claim 9, wherein all of said planes are parallel to one another, and remain parallel to one another during movement of said jaw members from said first position to said second position thereof.

11. A tool according to claim 9, wherein said first and second planes are coincident.

12. A tool according to claim 7, wherein said arms have slots arranged intermediate the ends thereof, said slots comprising the pivotal and sliding connection of said arms to said support member.

13. A tool according to claim 7, wherein all said pivotal connections comprise pins.

14. A tool for gripping a remotely located article comprising:
an elongated tubular housing defining a longitudinal axis of said tool;
a tool actuating assembly connected to one end of the housing, said tool actuating assembly comprises an over-center toggle mechanism;
jaw support means connected to the other end of said housing;
a first jaw member supported on said jaw support means and having a gripping surface;
a second jaw member supported on said jaw support means an having a gripping surface, said gripping surface of said second jaw member being disposed in parallel, confronting relation with said gripping surface of said first jaw member;
said jaw support means including a support member and first and second pairs of arms, at least one pair of which is slidingly and pivotably connected to said support member, said jaw support means connecting said tool actuating assembly to said first and second jaw members for movement of said first and second jaw members between a first position in which the gripping surfaces of said jaw members are disposed in spaced, parallel relation to one another and a second position in which the gripping surfaces of said jaw members are disposed in closer, parallel relation to one another than said first position for gripping an article therebetween;
wherein each of said arms has first and second ends, the first end of at least one of said arms being pivotally connected to said tool actuating assembly, the second end of said one arm being pivotally connected to one of said jaw members and said one arm being slidingly and pivotally connected to said support member intermediate the first and second ends of said one arm.

15. The tool according to claim 14 comprising a handle having a tubular section extending concentrically with the longitudinal axis of the tool and threadedly connected at one end to one end of the elongated tubular housing, an actuating piston slidingly received within the other end of the tubular section of said handle, a shaft connected to said actuating piston extending within said tubular housing and connecting said tool actuating assembly and said jaw support means, and said over-center toggle mechanism comprises a lever arm pivotally connected to said actuating piston and a link pivotably connected at one end to said lever arm and at the other end to said tubular section of said handle.

16. The tool according to claim 15 wherein said actuating piston is connected to said shaft by means of an adjustment knob which is held captive on said actuating piston and which is provided with an internal thread for threaded engagement with a threaded end of said shaft.

17. The tool according to claim 16, wherein said adjustment knob is rotatable on said actuating piston for movement of said shaft relative to said actuating piston by means of the threaded connection of said adjustment knob with said shaft for adjusting the distance between said first and second jaw members in said second position.

18. The tool according to claim 15, wherein all said pivotal connections comprise pins.

19. The tool according to claim 15 wherein said handle further comprises a gripping portion extending from said tubular section perpendicularly to the longitudinal axis of said tool, wherein said lever arm is formed so as to abut said gripping portion when said tool actuating assembly is moved so that said jaw members are in said second position in which the gripping surfaces of said jaw members are disposed in closer, parallel relation to one another for gripping an article therebetween.

20. A tool for gripping a remotely located article comprising:
an elongated tubular housing defining a longitudinal axis of said tool;
a tool actuating assembly connected to one end of the housing, said tool actuating assembly comprises an over-center toggle mechanism;
jaw support means connected to the other end of said housing;
a first jaw member supported on said jaw support means and having a gripping surface;
a second jaw member supported on said jaw support means and having a gripping surface, said gripping surface of said second jaw member being disposed in parallel, confronting relation with said gripping surface of said first jaw member;
said jaw support means including a support member and first and second pairs of arms, at least one pair of which is slidingly and pivotably connected to said support member, said jaw support means connecting said tool actuating assembly to said first and second jaw members for movement of said first and second jaw members between a first position in which the gripping surfaces of said jaw members are disposed in spaced, parallel relation to one another and a second position in which the gripping surfaces of said jaw members are disposed in closer, parallel relation to one another than said first position for gripping an article therebetween, further comprising a tubular sleeve extending coaxially with the longitudinal axis of the tool and connected at one end to one end of the elongated tubular housing, an actuating piston slidingly received within the other end of the tubular sleeve, a shaft connected to said actuating piston extending within said tubular housing and connecting said tool actuating assembly and said jaw support means, and said over-center toggle mechanism comprises a lever arm pivotally connected to said actuating piston and a link pivotally connected at one end to said lever arm and at the other end to said tubular sleeve.

21. The tool according to claim 20 wherein said lever arm is formed so as to lie against said elongated tubular housing when said tool actuating assembly is moved so that said jaw members are in said second position in which the gripping surfaces of said jaw members are disposed in close, parallel relation to one another for gripping an article therebetween.

22. A tool for gripping a remotely located article comprising:
an elongated tubular housing defining a longitudinal axis of said tool;
a tool actuating assembly connected to one end of the housing, said tool actuating assembly comprises an over-center toggle mechanism;
jaw support means connected to the other end of said housing;
a first jaw member supported on said jaw support means and having a gripping surface;
a second jaw member supported on said jaw support means and having a gripping surface, said gripping surface of said second jaw member being disposed in parallel, confronting relation with said gripping surface of said first jaw member;
said jaw support means including a support member and first and second pairs of arms, at least one pair of which is slidingly and pivotably connected to said support member, said jaw support means connecting said tool actuating assembly to said first and second jaw members for movement of said first and second jaw members between a first position in which the gripping surfaces of said jaw members are disposed in spaced, parallel relation to one another and a second position in which the gripping surfaces of said jaw members are disposed in closer, parallel relation to one another than said first position for gripping an article therebetween;
wherein each of said arms has first and second ends, the first ends of said arms being pivotally connected to said tool actuating assembly, the second ends of said first pair of arms being pivotally connected to said first jaw member, the second ends of said second pair of arms being pivotally connected to said second jaw member and said arms being slidingly and pivotally connected to said support member intermediate the first and second ends of said arms.

* * * * *